United States Patent [19]

Tedioli

[11] Patent Number: 4,925,150

[45] Date of Patent: May 15, 1990

[54] ELECTRIC GRINDER FOR PEPPER OR SALT

[75] Inventor: Pier G. Tedioli, Todi, Italy

[73] Assignee: Eugeio Bertagnoli, Cologno Monzese, Italy; a part interest

[21] Appl. No.: 144,053

[22] Filed: Jan. 15, 1988

[30] Foreign Application Priority Data

Jan. 15, 1987 [IT] Italy .................. 20513/87[U]

[51] Int. Cl.$^5$ ............................................. A47J 42/06
[52] U.S. Cl. ................................................. 241/169.1
[58] Field of Search ................. 241/101.2, 258, 259, 241/259.1, 168, 169.1, 169, 261.1, 93

[56] References Cited

U.S. PATENT DOCUMENTS

| 1,491,217 | 4/1924 | Wear . |
| 2,479,151 | 8/1949 | Bostick . |
| 2,578,901 | 12/1951 | Schmidt . |
| 3,465,800 | 9/1969 | Michaelis .................. 241/101.2 |
| 3,734,417 | 5/1973 | Russell et al. . |
| 3,827,641 | 8/1974 | Andersson ................... 241/169.1 X |
| 4,613,086 | 9/1986 | Granum et al. . |

FOREIGN PATENT DOCUMENTS

| 0201161 | 11/1986 | European Pat. Off. . |
| 2715956 | 10/1978 | Fed. Rep. of Germany ........ 241/93 |
| 2814272 | 10/1979 | Fed. Rep. of Germany ...... 241/168 |
| 3430196 | 12/1985 | Fed. Rep. of Germany ... 241/169.1 |
| 530429 | 12/1921 | France . |
| 612994 | 11/1926 | France . |
| 608365 | 1/1979 | Switzerland . |
| 788524 | 1/1958 | United Kingdom . |
| 2088745 | 6/1982 | United Kingdom ................ 241/168 |

Primary Examiner—Mark Rosenbaum
Attorney, Agent, or Firm—Stevens, Davis, Miller & Mosher

[57] ABSTRACT

A grinding device, particularly for grinding pepper or salt grains, comprises a container for the grains, a grinder positioned on the bottom of said container, a battery-fed electric motor, a reduction unit with high gear ratio, and a drive shaft connecting the reduction unit to the grinder and crossing said container. Said device is formed of two disengageable bodies, one of which consists of a motor unit comprising the motor, the reduction unit, the feed battery and a control pushbutton, and the other of which consists of a container having a rotary grinder mounted on its bottom, one end of the drive shaft being fixedly connected to the grinder. In said device, the other end of the drive shaft and, respectively, the outlet gear of the reduction unit have reciprocal connection means apt to be disengaged.

16 Claims, 2 Drawing Sheets

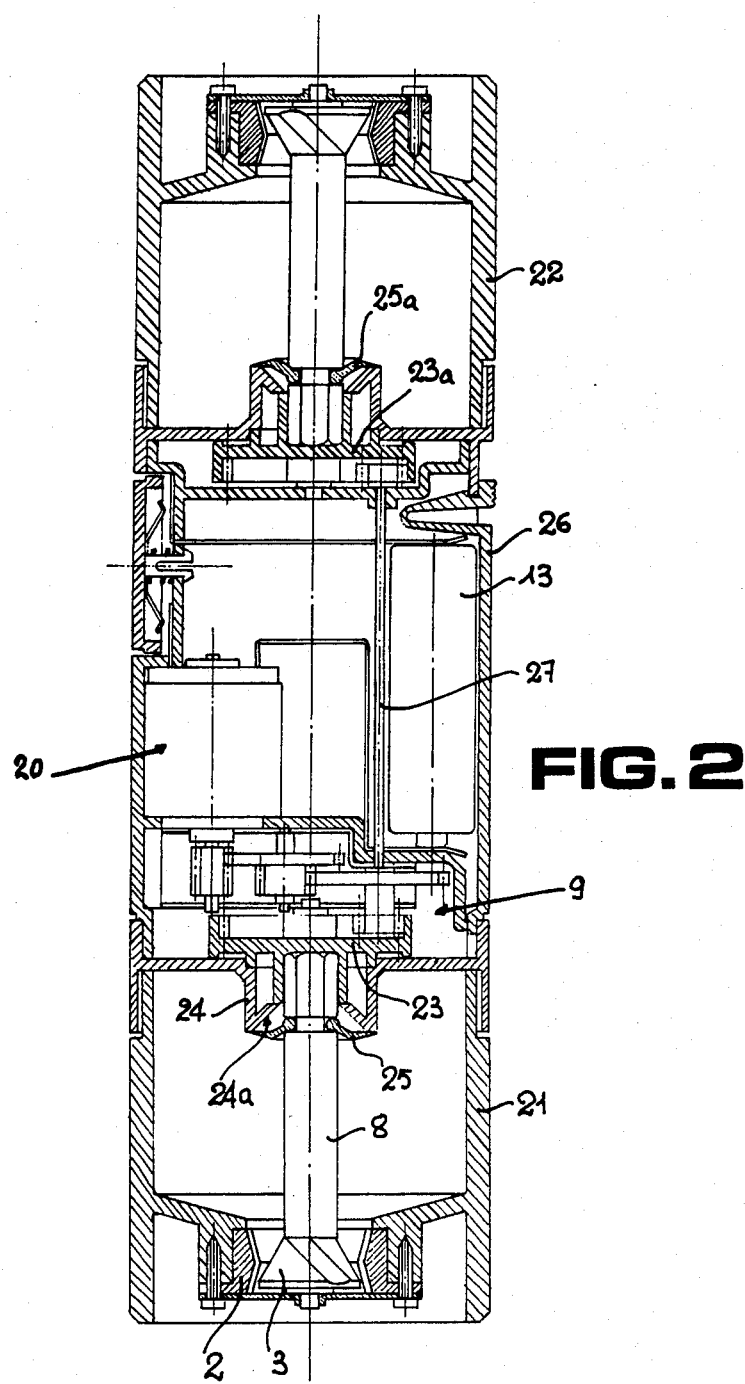

ELECTRIC GRINDER FOR PEPPER OR SALT

BACKGROUND OF THE INVENTION

1. Field of the Invention

The object of the present invention is an electric grinding device, apt to grind pepper or rock salt and meant to be placed on the dining table or in the kitchen.

"Pepper-grinders" having the most different shapes are widely known on the market, but they substantially comprise a feedbox, into which are introduced the pepper grains, and a grinder positioned at the bottom of the feedbox. The feedbox forms a first part of the pepper-grinder, which is held fast in one hand, while a second part of the pepper-grinder can be rotated in respect of the first, with the other hand, and controls the rotation of the rotary part of the grinder. This latter opens towards the lower part of the grinder to let out the ground pepper. Grinding adjustment means allow to obtain more or less finely ground pepper.

The object of the present invention is to realize a grinding device of this type, which is of more convenient and prompt use and which can be electrically operated.

Another problem one normally has at table is the use of salt. In fact, the fine salt which is introduced in salt-cellars, provided with a perforated cap, often has the tendency—especially due to humidity—to agglomerate, so that it becomes extremely difficult to let it out of the salt-cellar.

Another object of the present invention is therefore to realize a grinding device apt to grind rock salt at the moment of use, thereby eliminating the cited problem of fine salt agglomeration.

2. Description of the Prior Art

There are known to be in technique different devices apt to grind grain material, particularly coffee grains, which are electrically operated. Devices of this type are described for example in Patents FR-A-530 429, FR-A-612 994 and US-A-4 614 086. These devices are however of large dimensions and they make use of an electric motor of relatively high power, fed through the mains. Such devices are hence not apt to solve the problem lying at the basis of the invention, namely to realize a grinding device for pepper or salt, which is handy and small so as to be placed on the laid table, and which can therefore be operated by a battery-fed low power motor.

Devices which are more apt to answer these specific requirements are described for example in Patents GB-A-2 088 745 and US-A-3 734 417. These devices comprise—inside a relatively small body, or anyhow apt to be placed on the table—a battery-fed motor, which drives the grinding shaft through a reduction unit with high gear ratio. However these devices have two different inconveniences:

on one hand the motor, the reduction unit an the grinder form part of a unitary assembly which, in case of breakage or jamming, or even simply due to cleaning or maintenance, is difficult to disassemble, and in certain cases this can be done only by a skilled technician;

on the other hand, the filling with pepper or salt grains must be done in correspondence of the grinder, which requires each time the removal of the grinder itself, this operation being not always simple and in any case delicate.

The second of these problems is solved, according to the EP-A-0201161, due to the fact that the body of the device is formed in two parts, fixed one on the other by bayonet coupling. The upper part comprises the feeding system and the batteries, while the lower part—which contains the motor, the reduction unit and the grinder—comprises an annular chamber opening upwards, which can be directly filled with pepper or salt without having to disassemble the grinder. This result is however obtained thanks to a very complex structure, involving manufacturing costs which are too high in proportion to the article in question.

The device according to the CH-A-608 365, which is more simple and thus easy to realize, is also apt to solve the second heretofore specified problem of filling without disassembling the grinder. This is obtained thanks to a hopper opening formed laterally on the device, through which it is possible to fill the pepper or the salt grains which then drop down into the grinder. This solution, though simple, is not safe, as in case the device should be overturned or inclined on the table, the grains could freely drop out of the hopper opening.

SUMMARY OF THE INVENTION

The object of the present invention is therefore to realize a handy device for grinding pepper or salt grains, which is cheap and of simple construction, of easy maintenance and repair, and which also allows the filling of pepper and salt without having to disassemble the grinder.

This result is obtained in a device of the type described in the CH-A-608 365—comprising a grinder positioned onto the bottom of a container, a battery-fed electric motor, a reduction unit with high gear ratio, and a drive shaft connecting the reduction unit to the grinder and crossing said container.

With this construction it is therefore possible to obtain two advantages, i.e.:

the direct and easy filling with pepper or salt grains of the fully open container, without having to disassemble the grinder; and the structural separation of the grinder (more subject to cleaning and maintenance operations, or to jamming and repair) from the motor unit, which can be sealed for its best protection.

BRIEF DESCRIPTION OF THE DRAWINGS

Further characteristics and advantages of the invention are anyhow evident from the following description of some preferred embodiments, illustrated by way of example in the accompanying drawings, wherein:

FIG. 2 is a similar axial section view, showing a different embodiment of the grinding device.

DESCRIPTION OF THE PREFERRED EMBODIMENTS

Figure 1:
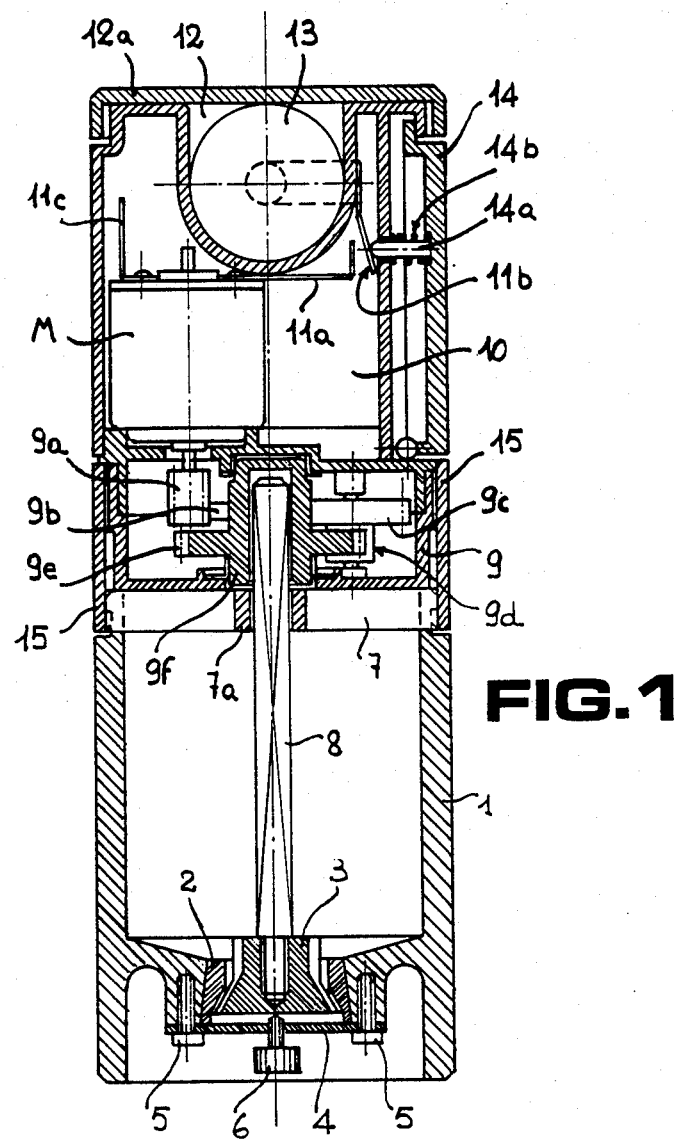
FIG. 1 is a diagrammatic axial section view of the grinding device.

As clearly shown in FIG. 1, the grinding device according to the invention comprises a container 1, onto the bottom of which, formed as a hopper, there is mounted a grinder consisting of a fixed wheel 2 and of a rotary wheel 3. A crosspiece 4, fixed to the container 1 by means of two bolts 5, keeps the wheel 2 in position. At the centre of the crosspiece 4 there is formed a threaded hole into which is screwed an adjusting screw 6; said screw can be operated from the bottom by means of its knurled head, and its point bears onto the lower surface of the grinder wheel 3 to adjust the axial position of this latter in respect of the fixed wheel 2 and thereby regulate the grinding fineness.

At the top of the container 1 there is fixed a crosspiece 7, possibly radially shaped, which supports a central bush 7a. Into the bush 7a is freely rotatable the drive shaft 8, the lower end of which is fixed to the wheel 3. Said fixing is for example obtained by means of a threaded tang screwed into a corresponding axial hole of the wheel 3 (as shown), or by other known means, so that the grinder wheel 3 is integral with the shaft 8 and is thus caused to rotate when said shaft rotates.

Above the container 1 there is fixed the motor unit comprising a reduction unit 9 with high gear ratio, a D.C. motor M, an electric switch shown diagrammatically by 11a, 11b, and a feed battery 13. The battery is contained in a proper housing 12, closed by a cover 12a. The switch 11a, 11b is preferably of the pressure type and is operated by a control push-button 14.

The fixing of the motor unit on the container 1 is obtained by screwing of the locking nut 15 onto the box 9 of the reduction unit, or by bayonet coupling; the nut 15 is in turn spring-locked or fixed with its lower edge onto the upper edge of the container 1.

As shown in FIG. 1, the motor M is fed by the battery 13 through a fixed connection 11c and the pair of contacts 11a and 11b. The switch 11a, 11b, is switched on under the pressure of a pin 14a integral with the push-button 14, which is pressed by a finger of the hand against the return action of the spring 14b.

The motor M causes the rotation of the gear 9a of the reduction unit 9, which controls, through a set of other gears 9b, 9c, 9d, the gearwheel 9e. This latter is the outlet gear of the reduction unit 9; it is preferably integral with a hub 9f, having a central hole of polygonal section, for instance square or hexagonal, into which directly engages, with slight slack, the upper end, of complementary section, of the drive shaft 8.

The coupling between the shaft 8 and the outlet gear of the reduction unit 9 could also be obtained with an inverted arrangement, namely by means of a square end pin of the reduction unit apt to engage into a square seat formed into a widening at the upper end of the shaft 8, or even through another similar device apt to allow a prompt axial disengagement.

Likewise, the reduction unit 9 is represented in the drawing by a set of interconnected gears, but it could evidently also consist of a different transmission system with high gear ratio, for example a gear and worm pair.

The working of the described device is evident: on switching on the switch 11a, 11b, under the pressure of the push-button 14, the motor M is connected to the battery 13 and caused to rotate. It then causes the rotation of the reduction unit 9, which in turn controls the rotation of the shaft 8 and thus of the grinder rotary wheel 3. The pepper or salt grains, contained in the hopper container 1, freely drop into the grinder and come out at the bottom in powder form, the fineness of which is regulated by means of the adjusting screw 6.

When the battery 13 is down, it can be replaced by lifting or unscrewing the cover 12a. When the pepper or salt supply in the container 1 has been used up, the motor unit is removed from the container 1 by being first of all rotated in respect of the nut 15, so as to be released therefrom, and by being then axially disengaged. In so doing, the coupling between the hub 9f and the upper end of the shaft 8 is axially removed with no difficulties. Once the container 1 has been supplied with pepper or salt, the motor unit is again fixed onto said container, taking care first of all to correctly insert the upper end of the shaft 8—notably projecting from the bush 7a exactly for this purpose—into the seat of the hub 9f. The motor unit is then fixed onto the container 1 by being caused to rotate, so as to secure the screwing onto the nut 15 or the bayonet coupling.

The embodiment of FIG. 2 differs from that of FIG. 1 in that it makes use of a single motor unit 20 and of two containers 21 and 22, associated on opposite sides of the motor unit. These two containers—one of which is provided, for example, for pepper and the other for salt—are identical, whereby only one of them is being described hereinafter.

The container 21 or 22 comprises—like the container 1 shown in FIG. 1—a grinder 2, 3, and the respective drive shaft 8; the upper end of this shaft also engages into the central hole of the outlet gear 23 of the reduction unit 9.

To facilitate this engagement, a cylindrical appendix 24 projects from the bottom of the motor unit 20, said appendix having a conical seat 24a which forms an invitation for the end of the shaft 8. In this way it has been found that it is no longer necessary to guide the shaft 8 with a bush—like the bush 7a of FIG. 1—because, even if its end slightly oscillates when the container 21 has been removed from the motor unit 20, the correct engagement is still guaranteed by the conical seat 24a.

On the other hand, the embodiment of FIG. 2 takes into account the possibility—in view of the particular structure of the device, which can be overturned according to whether one is using the pepper grinder or the salt grinder—that some powder of the ground grains may drop from the grinder back into the conical seat 24a. To prevent the powder from penetrating, from this position, into the box of the reduction unit 9, a sealing gasket 25 is provided in the form of a ring, the inner lip of which is engaged into a circular groove of the shaft 8, while its outer lip bears onto the edge of the conical seat 24a. When the shaft 8 rotates, the gasket 25 rotates therewith, but no ground powder is apt to penetrate between the outer sealing lip and the edge of the conical seat 24a.

In order to operate the shafts 8 of both containers 21 and 22, the motor unit of the embodiment of FIG. 2 differs from that of FIG. 1:

on one hand, for what concerns the positioning of the housing for the battery 13 which, in this case, is lateral and closed by a side cover 26;

on the other hand for the fact that, on the side of the container 22, a single gear 23a is provided, forming the twin-gear of the outlet gear 23 of the reduction unit 9, these two identical gears being reciprocally connected by a spindle 27. This is obviously in order to use, besides the same motor, also the same reduction unit. It should be noted, in this respect, that the grinding operation is in any case performed by only one of the two grinders, namely the one positioned below, since no grains can drop into the other grinder which is overturned; in this way the motor is not overworked.

I claim:

1. A grinding device, particularly for grinding pepper or salt grains, consisting of disengageable first, second and third bodies, said first body housing a motor unit comprising a motor, a reduction unit having an outlet gear, a feed battery and a control push-button, said second body consisting of a container having a grinder defining a fixed part and a rotary part mounted on its bottom, a drive shaft passing through said container of said second body, one end of which is fixedly connected to the rotary part of the grinder, and the other end of which is disengageably connected to said outlet gear, said outlet gear and drive shaft forming together a first reciprocal axially slidable connection means and said third body consisting of a container having a grinder defining a fixed part and a rotary part mounted on its bottom, a twin gear similar to the outlet gear of the reduction unit, a drive shaft passing through said container of said third body, one end of which is fixedly connected to the rotary part of the grinder and the other end of which is disengageably connected to said twin gear, said twin gear and drive shaft forming together a second reciprocal axially slidable connection means, the outlet gear of the reduction unit and the twin gear being reciprocally engaged by a spindle which passes through the motor unit, said second and third bodies having adjusting means mounted on the fixed parts of said grinders.

2. The grinding device of claim 1, wherein said motor unit is axially removable from the first body and said reciprocal connection means consist of a male and female coupling, also axially disengageable.

3. The grinding device of claim 2, wherein said first and second reciprocal connecting means comprise, on one side, a non circular section of the end of each of the drive shafts and, on the other side, a hollow seat complementary section of the outlet gear of the reduction unit and the twin gear.

4. The grinding device of claim 3, including sealing gaskets, said sealing gaskets being provided between said drive shafts and the hollow seat of the reduction unit and the hollow seat of the twin gear.

5. The grinding device of claim 4, wherein each said drive shaft defines a circular groove and each said sealing gasket defines a ring having an inner lip, said inner lip of each sealing gasket engaging into said circular groove formed on each drive shaft and which rotates together with the drive shaft.

6. The grinding device of claim 5, wherein the outer lips of said sealing gaskets bear on the edge of the conical seat of said appendix of the motor unit and twin gear.

7. The grinding device of claim 3, wherein said hollow seats are formed in the hub of the outlet gear and the twin gear.

8. The grinding device of claim 3, wherein appendices project from the motor unit, near the outlet gear of the reduction unit and from the twin gear, each said appendix having a conical seat which forms an invitation for the ends of the drive shafts, the apexes of said conical seats being connected to said hollow seats of the outlet gear of the reduction unit and of the twin gear.

9. The grinding device of claim 8, including sealing gaskets having outer lips, said outer lips of said sealing gaskets bearing on the edge of the conical seat of said appendix of the motor unit and the appendix of the twin gear.

10. The grinding device of claim 2, wherein said first and second reciprocal connection means comprise, on one side, a non-circular hollow seat formed at the end of the drive shafts and, on the other side, a complementary male section of a hub of said outlet gear of the reduction unit and a hub of said twin gear.

11. The grinding device of claim 1, wherein said second and third bodies are associated to said motor unit on opposite sides thereof, said second and third bodies and motor unit in operation being non-rotatable with respect to each other.

12. The grinding device of claim 1, wherein said reduction unit with high gear ratio comprises a set of interconnected gears.

13. The grinding device of claim 1, wherein said reduction unit with high gear ratio comprises a gear and worm pair.

14. The grinding device of claim 1, wherein said motor unit comprises a press switch.

15. The grinding device of claim 1, wherein said motor unit comprises a D.C. motor and a housing for an interchangeable battery feeding said motor.

16. The grinding device of claim 1, including adjusting screws mounted on the fixed part of said grinder adapted to adjust the axial position of the rotary part of the grinder in respect of its fixed part.

* * * * *